(12) United States Patent
Basiana Marti et al.

(10) Patent No.: US 12,529,608 B2
(45) Date of Patent: Jan. 20, 2026

(54) SENSOR ARRANGEMENT

(71) Applicant: TDK Electronics AG, Munich (DE)

(72) Inventors: Jordi Basiana Marti, Berlin (DE); Florian Winkler, Berlin (DE)

(73) Assignee: TDK Electronics AG, Munich (DE)

( * ) Notice: Subject to any disclaimer, the term of this patent is extended or adjusted under 35 U.S.C. 154(b) by 652 days.

(21) Appl. No.: 17/999,007

(22) PCT Filed: Jun. 14, 2021

(86) PCT No.: PCT/EP2021/065931
§ 371 (c)(1),
(2) Date: Nov. 16, 2022

(87) PCT Pub. No.: WO2021/254949
PCT Pub. Date: Dec. 23, 2021

(65) Prior Publication Data
US 2023/0175898 A1 Jun. 8, 2023

(30) Foreign Application Priority Data
Jun. 16, 2020 (DE) .......................... 102020115856.4

(51) Int. Cl.
G01K 13/02 (2021.01)
G01K 1/14 (2021.01)
G01K 7/22 (2006.01)

(52) U.S. Cl.
CPC ............... *G01K 13/02* (2013.01); *G01K 1/14* (2013.01); *G01K 7/22* (2013.01)

(58) Field of Classification Search
CPC ............. G01K 13/02; G01K 1/14; G01K 7/22
USPC .................................................. 374/208, 147
See application file for complete search history.

(56) References Cited

U.S. PATENT DOCUMENTS

| | | | |
|---|---|---|---|
| 5,707,151 A * | 1/1998 | Parker | G01K 1/143 374/E1.019 |
| 6,334,707 B1 | 1/2002 | Ku | |
| 6,550,962 B1 * | 4/2003 | Yang | G01K 1/143 374/E1.019 |
| 10,656,022 B2 | 5/2020 | Tanaka et al. | |
| 2009/0190630 A1 | 7/2009 | Hong et al. | |
| 2013/0182745 A1 | 7/2013 | Hertel et al. | |
| 2016/0320243 A1 | 11/2016 | Bard et al. | |
| 2018/0058942 A1 | 3/2018 | Weigand et al. | |

(Continued)

FOREIGN PATENT DOCUMENTS

| | | |
|---|---|---|
| CN | 201464070 U | 5/2010 |
| CN | 102072793 A | 5/2011 |

(Continued)

OTHER PUBLICATIONS

Translation of DE202020101413U1.*

*Primary Examiner* — Mirellys Jagan
(74) *Attorney, Agent, or Firm* — Slater Matsil, LLP

(57) ABSTRACT

In an embodiment a sensor arrangement includes a mounting element configured to mount the sensor arrangement directly to a surface, a basic body removably attached to the mounting element, at least one sensor element arranged in an interior of the basic body and a separating element which is at least partly arranged in the basic body, wherein the separating element is configured to hold the sensor element in a fixed position with respect to the basic body.

13 Claims, 4 Drawing Sheets

(56) References Cited

U.S. PATENT DOCUMENTS

2018/0364108 A1   12/2018  Tanaka et al.
2019/0386419 A1* 12/2019  Matsunaga .......... H01R 13/405
2020/0149974 A1    5/2020  Hand et al.

FOREIGN PATENT DOCUMENTS

| CN | 103207032 A | 7/2013 |
|---|---|---|
| CN | 107782458 A | 3/2018 |
| CN | 207335904 U | 5/2018 |
| DE | 102013021798 A1 | 6/2015 |
| DE | 102017116533 A1 | 1/2019 |
| DE | 202020101413 U1 | 4/2020 |
| EP | 1384979 A1 | 1/2004 |
| JP | H0741434 U | 7/1995 |
| JP | 2018105643 A | 7/2018 |

* cited by examiner

SENSOR ARRANGEMENT

This patent application is a national phase filing under section 371 of PCT/EP2021/065931, filed Jun. 14, 2021, which claims the priority of German patent application 102020115856.4, filed Jun. 16, 2020, each of which is incorporated herein by reference in its entirety.

TECHNICAL FIELD

The present invention relates to a sensor arrangement for measuring the temperature of a surface, in particular the surface of a pipe. Moreover, the present invention relates to the use of a sensor arrangement for measuring the surface temperature of a pipe. Moreover, the present invention relates to a method for assembling a sensor arrangement for measuring a surface temperature of a pipe.

BACKGROUND

Measuring a surface temperature in a high temperature environment, as is usually the case with pipes, places high demands on the equipment. The sensor must withstand the high temperatures up to 200° C. and often must also cope with high humidity and permanent vibrations, i.e. in automotive applications.

Current solutions for measuring the surface temperature of a pipe do not fulfill all problems encountered. They can either only operate up to 120° C. or are not humidity resistant (IP rating lower than IP68). Additionally or alternatively, they have a low response time (most of the current solutions for the automotive market are based on metal tubes, where the sensing element is freely mounted inside leading to a slow response time) or they are equipped with a complicated mounting mechanism (e.g. wrapping systems around the pipe or they use additional mounting materials such as glue).

SUMMARY

Embodiments provide a sensor arrangement which solves the above mentioned problems.

According to a first embodiment of the present disclosure, a sensor arrangement is provided. The sensor arrangement is configured for measuring a temperature of a surface, e.g. the surface temperature of a tubular component such as a pipe. The sensor arrangement is specifically adapted to be used in automotive applications.

The sensor arrangement comprises a mounting element. The mounting element is configured for mounting the sensor arrangement directly to the surface the temperature of which is to be measured, e.g. the surface of a pipe. Accordingly, the sensor arrangement can be placed especially close to the surface, in particular it can be placed onto the surface. Thus, provision of a sensor arrangement with a very fast response time and high accuracy is facilitated.

The mounting element is further configured for mounting the sensor arrangement releasably to the surface. This means that the sensor arrangement could be placed at different locations of the surface or at different surfaces/pipes. Thus, the sensor arrangement is particularly flexible in use.

The sensor arrangement further comprises a basic body. The basic body is attached, in particular removably attached, to the mounting element. This means that the basic body can be detached from the mounting element, e.g. for fixing the basic body to a different mounting element and, thus, to a different pipe surface, e.g. a pipe surface with a smaller or larger diameter. This makes the sensor arrangement particularly flexible in use.

The sensor arrangement further comprises at least one sensor element. The sensor element is arranged in an interior of the basic body. The sensor element is arranged completely in the interior of the basic body. The sensor element may comprise an NTC thermistor.

The sensor arrangement further comprises a separating element. The separating element is at least partly inserted into the basic body. The separating element constitutes an insert of the basic body. The separating element is non-releasably attached to the basic body. Preferably, the separating element is glued to the basic body, for example by means of a resin.

The separating element is adapted and arranged to hold the sensor element in a fixed position with respect to the basic body and, thus, with respect to the surface. In particular, the separating element holds the sensor element in a position close to the surface the temperature of which is to be measured. Accordingly, the sensor element cannot freely move inside the basic body. In this way, the response time of the sensor arrangement is optimized.

The sensor arrangement is designed to operate in a high temperature environment. Moreover, the sensor arrangement is designed to have a very good performance against high humidity and corrosion. Altogether, a very robust, efficient and flexibly applicable sensor arrangement is provided.

According to one embodiment, the sensor arrangement comprises a locking mechanism. The locking mechanism is adapted and arranged to lock, in particular releasably lock, the basic body to the mounting element. The locking mechanism comprises at least one, preferably exactly one, first locking element. The locking mechanism comprises at least one, preferably exactly one, second locking element. The first and second locking element are adapted and arranged to mechanically cooperate with one another to lock the basic body to the mounting element. In particular, the first and second locking element releasably engage to fix the position of the basic body relative to the mounting element.

This allows the sensor arrangement to withstand the vibration conditions specified for the automotive market. Moreover, the releasable locking between the basic body and the mounting element allows the same basic body of the sensor arrangement to be mounted on pipes with different diameters.

According to one embodiment, the first locking element is arranged at the separating element. In particular, the first locking element is arranged in an end side region of the separating element. The first locking element is part of the separating element. In particular, separating element and first locking element are unitarily formed. The first locking element extends in a direction away from the surface of the pipe once the sensor arrangement is mounted to the surface. The first locking element may comprise a protrusion extending from the separating element towards the mounting element.

According to one embodiment, the second locking element is arranged on the mounting element. The second locking element is part of the mounting element. The second locking element may comprise an indentation or cut-out of the mounting element. The first locking element is adapted and arranged to protrude through the second locking element for releasably fixing the basic body to the mounting element. In this way, provision of a reliable sensor arrangement which can withstand permanent vibration is facilitated.

According to one embodiment, the mounting element comprises at least one fixation spring. Preferably, the mounting element comprises two fixation springs. However, the mounting element can also comprise more than two fixation springs, e.g. three fixation springs. The mounting element and the fixation spring are unitarily formed. In outer words, the fixation spring is part of the mounting element.

The fixation spring is adapted and arranged to hold the basic body in a fixed position with respect to the mounting element. In particular, the at least one fixation spring prevents the basic body to fall off the mounting element during delivery and application in combination with the locking mechanism. In this way, provision of a reliable sensor arrangement is facilitated.

According to one embodiment, the separating element is adapted and arranged to provide an insulation of the sensor arrangement. The separating element comprises an insulating material. In particular, the separating element comprises a plastic material, e.g. a polymer. Furthermore, the separating element is designed to separate leads/wires of the sensor element from one another and to separate the connection between the wires and the sensor element (which is exposed) of the (metal) basic body. In this way, short circuits are avoided and the reliability of the sensor arrangement is increased.

According to one embodiment, the mounting element is at least partly elastically deformable. The mounting element may comprise a spring element. Preferably, the mounting element comprises a clip. In this way, the sensor arrangement can be easily mounted to the surface the temperature of which is to be measured in a one-step process without the need of further materials, e.g. glue. At the same time, the sensor arrangement can withstand the required torque and extraction forces in automotive applications.

According to one embodiment, the sensor arrangement is adapted to operate within the range of −40° C. to +200° C. Accordingly, the sensor arrangement can be applied to a wide variety of applications with diverse requirements. The sensor arrangement is adapted to operate under conditions with high humidity (IP68). Furthermore, the sensor arrangement is adapted to withstand permanent vibrations, torque and extraction forces. Altogether, a very robust and flexibly applicable sensor arrangement is provided.

According to a further embodiment, a use of a sensor arrangement is described. The sensor arrangement may be the previously described sensor arrangement. All features described in connection with the sensor arrangement apply for the use of the sensor arrangement and vice versa.

The sensor arrangement is used for measuring the surface temperature of a pipe. The sensor arrangement is releasably attached, in particular clipped, to a surface of the pipe. The sensor arrangement is adapted and designed to measure the temperature of pipes in a very accurate way, in a high temperature environment (up to 200° C.) with high humidity (IP68) and permanent vibration, i.e. in automotive applications.

The design of the sensor arrangement allows to use only one basic body for all different pipe diameters. Moreover, the design brings the sensor element always close to the surface.

the temperature of which is to be measured. It is providing high accuracy measurement and a fast response time. The design allows the sensor to be easily mounted to the customer interface in a one-step process (clipping) without further additional materials. Altogether, a highly efficient and flexible sensor arrangement is used to measure the surface temperature of a pipe.

According to a further embodiment, a method for assembling a sensor arrangement for measuring the surface temperature of a pipe is described. The sensor arrangement may be the previously described sensor arrangement. All features described in connection with the sensor arrangement apply for the method and vice versa.

The method comprises the following steps:
A) Providing a sensor element, a basic body, a separating element, a mounting element and at least two leads or wires. The said elements may correspond to the elements of the previously described sensor arrangement and may comprise the same features and advantages.
B) Electrically connecting the sensor element by means of the wires and introducing the sensor element and the wires into the separating element. The separating element may be an insulating element. The separating element may separate the wires from one another. The separating element may further separate the wires from a possible short circuit connection to the basic body.
C) Introducing the separating element, the wires and the sensor element into the basic body such that the sensor element is fixed against movement relative to the basic body. In other words, by means of the separating element, the sensor element is hold in its position with respect to the basic body and, thus, with respect to the pipe surface. The position of the sensor element may be a position as close as possible to the pipe surface. In this way, a fast response time and a high measurement accuracy can be assured.
D) Non-releasably fixing the separating element to the basic body. Preferably, the separating element is glued to the basic body. For this purpose a connecting element (e.g. a resin) may be introduced into the basic body prior to introducing the separating element, the wires and the sensor element into the basic body.
E) Removably locking the basic body to the mounting element. The basic body may be locked to the mounting element by means of the previously described locking mechanism and the fixation springs. This allows the same basic body to be mounted to pipes with different parameters.

According to an embodiment, in a next step F) the sensor arrangement is clipped to the surface of a pipe. In particular, the sensor arrangement is mounted to the pipe surface in a simple one-step process without the use of further materials.

BRIEF DESCRIPTION OF THE DRAWINGS

Further features, refinements and expediencies become apparent from the following description of the exemplary embodiments in connection with the figures.

DETAILED DESCRIPTION OF ILLUSTRATIVE EMBODIMENTS

Figure 1:
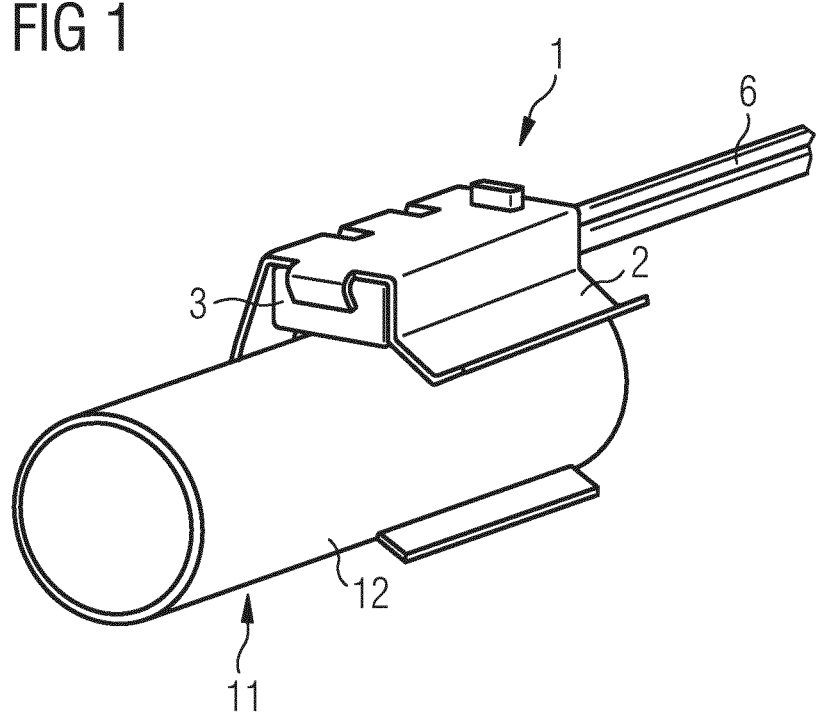
FIG. 1 schematically shows a perspective view of a sensor arrangement attached to a surface of a pipe.
Figure 2:
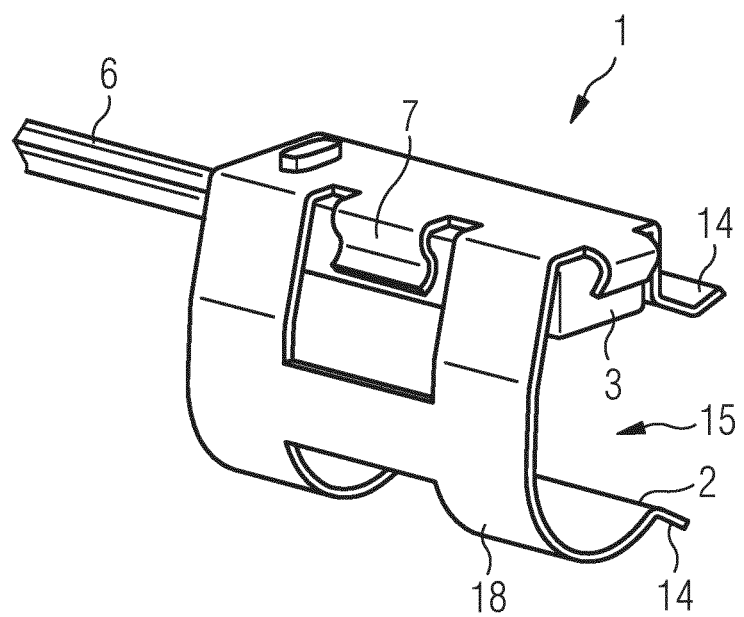
FIG. 2 schematically shows a perspective view of the sensor arrangement according to FIG. 1.

In the figures, elements of the same structure and/or functionality may be referenced by the same reference numerals. It is to be understood that the embodiments shown in the figures are illustrative representations and are not necessarily drawn to scale.

FIGS. 1 to 5 show a sensor arrangement 1. The sensor arrangement 1 is configured to measure the temperature of a surface 12. The sensor arrangement 1 is configured to be mounted directly to the surface 12 for measuring the temperature of the surface 12.

Figure 5:
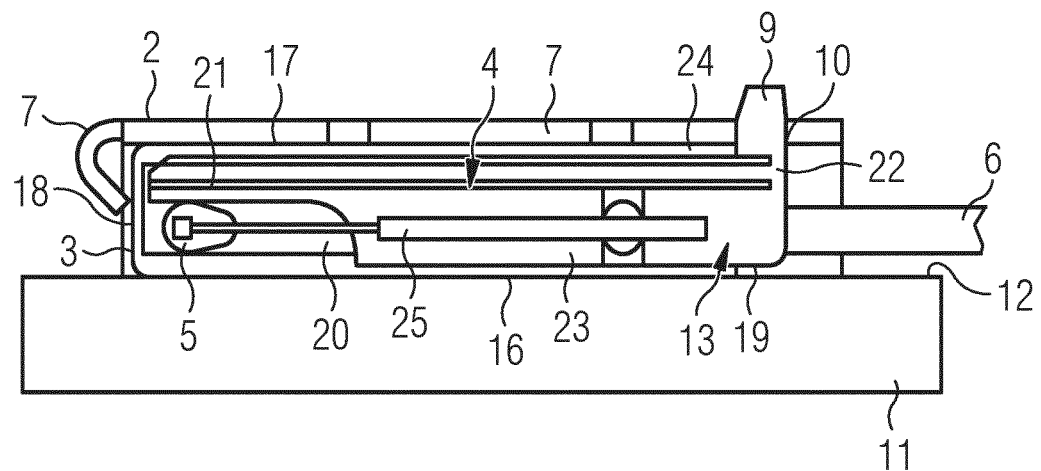
FIG. 5 schematically shows a sectional view of the sensor arrangement attached to a pipe according to FIG. 1.

In FIGS. 1 and 5, the sensor arrangement 1 is attached to the surface 12 of a pipe 11. However, the sensor arrangement 1 is of course adapted to be attached to and to measure the surface temperature of any further tubular-like component. For the sake of clarity, in the following, reference is made only to a pipe 11 the surface temperature of which is to be measured.

Figure 4A:
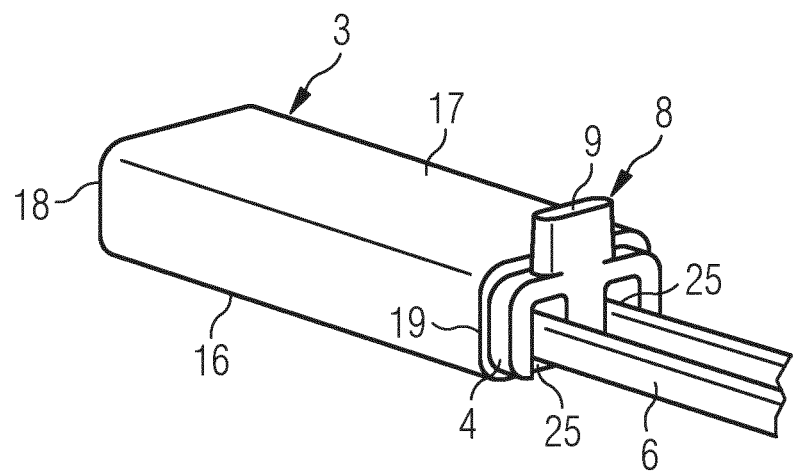
FIGS. 4A and 4B schematically show a perspective view of at least parts of the sensor arrangement according to FIG. 1.
Figure 4B:
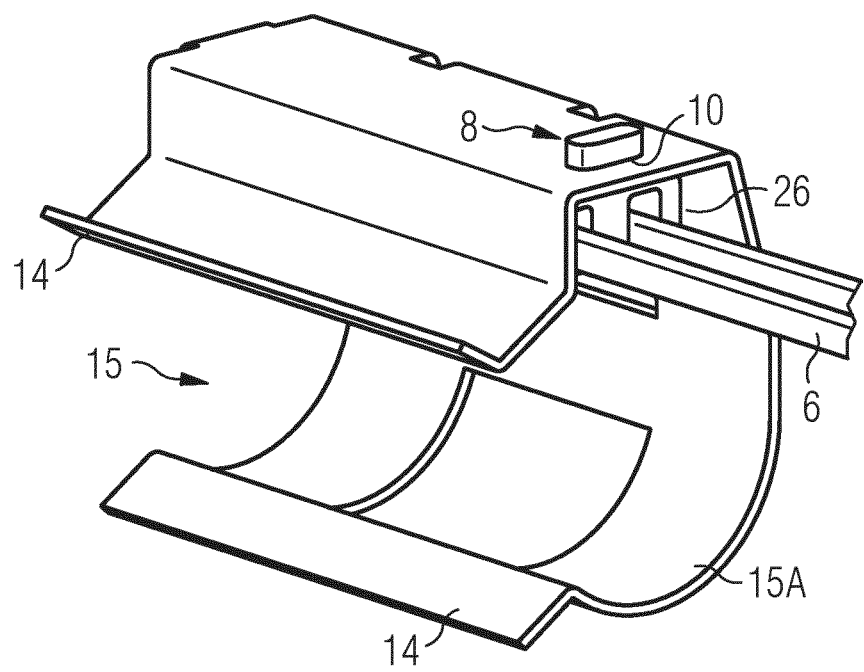

The sensor arrangement 1 comprises a mounting element 2, a basic body 3, a wiring/wires/leads 6 for electrically connecting the sensor arrangement 1, a sensor element 5 (see FIG. 5) and a separating element 4 (see, in particular, FIGS. 4A, 4B and 5).

The basic body 3 is adapted and arranged to receive the sensor 5, at least parts of the wiring 6 and at least parts of the separating element 4. The basic body 3 comprises a bottom side 16, an upper side 17, a first side face 18 and a second side face 19 (FIGS. 4A and 5). The bottom side 16 is that side of the basic body 3 which is closest to the surface 12 of the pipe 11 once the sensor arrangement 1 is mounted to the surface 12 (see FIGS. 1 and 5). Bottom side 16 and upper side 17 are oppositely arranged. The first side face 18 of the basic body 3 is closed. The second side face 19 is open. The side faces 18, 19 are oppositely arranged.

The basic body 3 has a high thermal conductivity. Preferably, the pipe 11 and the basic body 3 comprise the same material. The basic body 3 comprises metal, preferably aluminum. The sensor element 5 comprises an NTC thermistor. The sensor element 5 is arranged completely within the basic body 3. In particular, the sensor element 5 is located in the interior of the basic body 3 at the bottom side 16 of the basic body 3. In other words, the sensor element 5 is arranged as close to the surface 12 as possible in order to increase the measurement accuracy and to provide a very fast response time. The sensor element 5 is located close to the first (i.e. closed) side face 18 of the basic body 3.

The separating element 4 is inserted at least in parts, preferably almost completely, into the basic body 3. The separating element 4 is non-releasably attached to the basic body. Preferably, the separating element 4 is glued to the basic body, e.g. by means of a resin. The separating element 4 comprises an insulating material. The separating element 4 comprises plastic, preferably a polymer.

The separating element 4 comprises a bottom side 23 and an upper side 24 which are oppositely arranged (see FIG. 5). The separating element 24 further comprises a first side face 21 and a second side face 22 which are oppositely arranged. The first side face 21 is located close, in particular adjacent, to the first side face 18 (i.e. the closed side face) of the basic body 3 once the separating element 4 is inserted into the basic body 3. The second side face 22 is located close to the second side face 19 (i.e. the open side face) of the basic body 3 once the separating element 4 is inserted into the basic body 3.

The second side face 22 of the separating element 4 partly protrudes from the second side face 19 of the basic body 3 as can be gathered from FIG. 5, for example. In other words, the separating element 4 is only partly introduced into the basic body 3, which is explained later on in more detail.

The separating element 4 is configured in such a way that it holds the sensor element 5 in its position on the bottom side 16, i.e. close to the surface 12 the temperature of which is to be measured. For this purpose, the separating element 14 comprises an indentation/cut-out/cavity 20 (see FIG. 5). The indentation 20 is arranged in the region of the first side face 21. The indentation 20 extends from the first side face 21 in a direction towards the second side face 22. The indentation 20 extends from the bottom side 23 of the separating element 4 towards the upper side 24 of the separating element 4. The indentation 20 is adapted and arrange to receive the sensor element 5 such that the sensor element 5 is fixed in its position relative to the basic body 3 and, thus, relative to the surface 12. In this way, provision of a reliable sensor arrangement with a fast response time is facilitated.

The separating element 4 is further configured to ensure an insulation of the sensor arrangement 1. In particular, the separating element 4 is configured to separate the two leads/wires 6 from one another which leads/wires 6 are used for electrically connecting the sensor element 5. The separating element 4 is further configured to separate the two leads/wires 6 from the metal basic body 3.

For this purpose, the separating element 4 comprises two separate cavities 25 (FIGS. 4A and 5). It should be noted that the number of cavities 25 corresponds to the number of leads/wires 6. In an embodiment with more than two wires 6, the number of cavities 25 is increased accordingly.

The cavities 25 are adapted and arranged to receive the wires 6 and to separate them from one another. The cavities 25 are tubular shaped. The cavities 25 run parallel to each other. The cavities 25 extend from the second side face 22 of the separating element 4 up into the previously described indentation 20. One respective lead/wire 6 is led through one of said cavities 25 up to the sensor element 5. The cavities 25 enable a reliable electrical connection of the sensor element 5 while ensuring the electrical insulation of the sensor arrangement 1.

The separating element 4 is further configured to securely releasably lock the basic body 3 and, thus, the sensor element 5, to the mounting element 2. For this purpose, the separating element 4 comprises a first locking element 9. The first locking element 9 is arranged in an end side region 13 of the separating element 4 (FIG. 5). In particular, the first locking element 9 is arranged in the region of the second side face 22 of the separating element 4. For this purpose, the second side face 22 partly protrudes from the basic body 3 as described above.

The first locking element 9 and the separating element 4 are unitarily formed. The first locking element 9 comprises a protrusion. The first locking element 9 is shaped as a saw tooth. The first locking element 9 protrudes from the upper side 24 of the separating element 4 in a direction away from the surface 12 of the pipe 11. The first locking element 9 protrudes from the separating element 4 towards the mounting element 2.

The sensor arrangement 1 and, in particular the mounting element 2, comprises a second locking element 10. First and second locking element 9, 10 are adapted and arranged to mechanically cooperate with one another to securely releasably attach/fix the basic body 3 to the mounting element 2. The first and second locking element 9, 10 constitute a locking mechanism 8 of the sensor arrangement 1. The second locking element 10 comprises an indentation or cut-out of the mounting element 2, which is described later on in more detail.

The sensor arrangement 1 comprises the previously mentioned mounting element 2 which is adapted to receive and hold the basic body 3 and to attach the sensor arrangement 1 to the surface 12 of the pipe 11. The mounting element 2 comprises metal, e.g. stainless steel. The mounting element 2 is at least partly elastically deformable. The mounting element 2 comprises a clip.

Figure 3A:
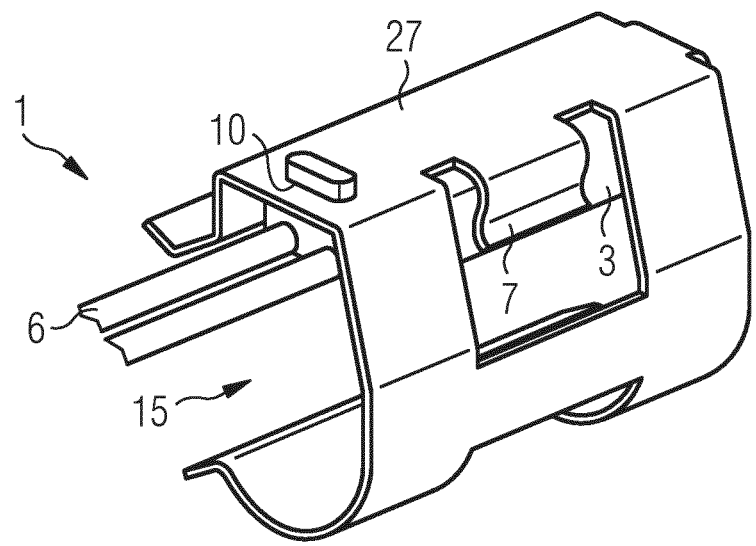
FIGS. 3A and 3B schematically show a further perspective view of the sensor arrangement according to FIG. 1.
Figure 3B:
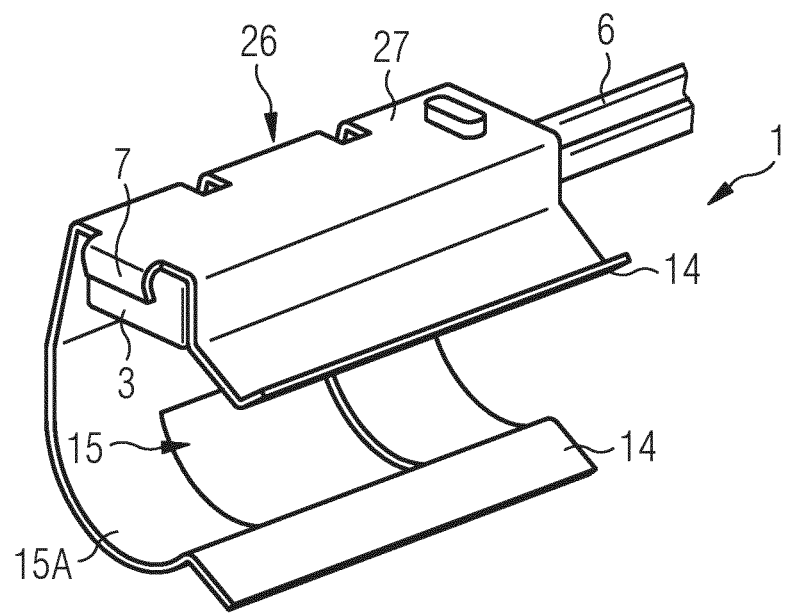

For receiving the basic body 3, the mounting element 2 comprises a receiving area 26 (see, for example, FIGS. 3B and 4B). The receiving area 26 is a hollowed out region of the mounting element 2. In the receiving area 26, an inner diameter of the mounting element 2 is enlarged to introduce the basic body 3. In other words, the basic body 3 is introduced partly into the mounting element 2 from an inner side of the mounting element 2.

This receiving area 26 is shaped rectangulary and comprises an inner dimension suited for receiving the basic body 3 at least partly. An upper face 27 (FIGS. 3A and 3B) of the receiving area 26 comprises the previously mentioned second locking element 10 which is configured to mechanically cooperate with the first locking element 9 to fix the basic body 3 to the mounting element 2. The second locking element 10 constitutes an indentation or cut-out in the upper face 27.

When the basic body 3 is fixed to the mounting element 2, the first locking element 9 is brought into mechanical cooperation with the second locking element 10. In other words, the first and the second locking element 9, 10 engage with one another. In particular, the first locking element 9 is received by the second locking element 10. The first locking element 9 is introduced into the second locking element 10 such that the first locking element 9 protrudes partly from the second locking element 10 and out of the upper face 27 of the mounting element 2 (FIGS. 3A, 3B, 4B and 5).

For receiving and holding the basic body 3 and, thus, the sensor element 5 and the separating element 4, the mounting element 2 further comprises at least one, preferably two, fixation springs 7 (see, in particular, FIGS. 3A, 3B and 5). The fixation springs 7 extend from the upper face 27 towards the surface 12 of the pipe 11.

The fixation springs 7 constitute elastically deformable tabs grabbing the side faces of the basic body 3. In particular, in this embodiment, one fixation spring 7 grabs the first (i.e. closed) side face 18 of the basic body, i.e. that side face 18 opposite to the side face comprising the locking mechanism 8 (second side face 19).

The further fixation spring 7 grabs a longitudinal side face of the basic body 3, wherein the longitudinal side face is that side face which extends between the first and the second side faces 18, 19 of the basic body 3. The fixation springs 7 prevent the basic body 3 and, thus, the sensor element 5 from falling off during delivery and application of the sensor arrangement 1 in combination with the previously described locking mechanism 8.

The mounting element 2 is further configured to mount the sensor arrangement 1 directly and releasably to the surface 12 of the pipe 11. The mounting element 2 is adapted and arranged to at least partly enclose the surface 12 of the pipe 11. The mounting element 2 comprises an inner region 15 (FIGS. 3A, 3B, 4B). The inner region 15 is configured to receive the pipe 11 at least partly. The inner region 15 has a rounded and/or smooth surface 15A to reliably receive and hold the pipe 11 without damaging the pipe 11.

The mounting element 2 further comprises free ends 14 (FIGS. 3B and 4B). The free ends 14 are oppositely arranged to one another. One of the said free ends 14 follows directly to the receiving area 26. The free ends 14 are arcuate shaped.

The free ends 14 are elastically deformable to mount the mounting element 2 to the surface 12. In particular, for attaching the mounting element 2 to the surface 12, the free ends 14 are bent apart for inserting the pipe 11 at least partly into the inner region 15 of the mounting element 2. Once the mounting element 2 is attached to the surface 12, the free ends 14 elastically deform back towards their original position with respect to one another.

In the following, the assembly of the sensor arrangement 1 and the mounting of the sensor arrangement 1 to the surface 12 of the pipe 11 are described.

In a first step the sensor element 5, the basic body 3, the separating element 4, the mounting element 2 and at least two leads/wires 6 are provided.

In a next step the sensor element 5 and the two leads/wires 6 are mechanically and electrically connected. The sensor element 5 and the wires 6 are then mounted into the separating element 4, thereby the wires 6 are introduced into the cavities 25 of the separating element 4.

In a next step a connecting element (for example glue/resin) is introduced into the basic body 3.

In a further step the separating element 4, the wires 6 and the sensor element 5 are introduced into the basic body 3 such that the sensor element 5 is arranged at the bottom side 16 of the basic body 3. The separating element 4 is non-removably fixed to the basic body 3 by means of the connecting element, e.g. glue/resin.

In a next step the basic body 3 is releasably fixed to the mounting element 2 by means of the locking mechanism 8 and the fixation springs 7 as described above.

Figure 6:
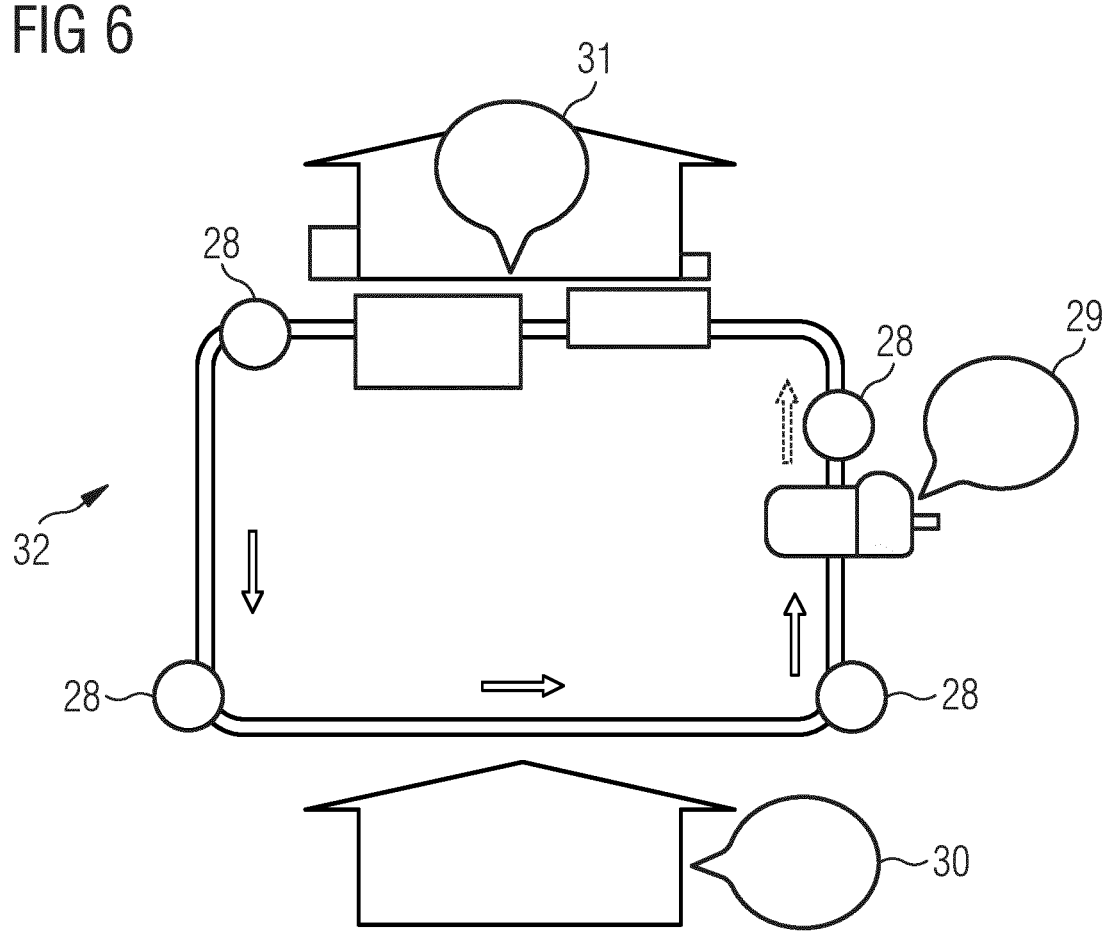
FIG. 6 schematically shows an application of the sensor arrangement.

In a next step the sensor arrangement 1 is mounted to the surface 12 of the pipe 11 in one step without the use of further materials. In particular, the sensor arrangement 1 is clipped to the surface 12 of the pipe 11. Thereby, the free ends 14 of the mounting element 2 are elastically deformed such that the surface 12 of the pipe 11 can be introduced into the inner region 15. Afterwards, the free ends 14 deform back towards their initial position. FIG. 6 schematically shows a possible application of the sensor arrangement 1 described above. In particular, FIG. 6 illustrates the different possible locations 28 of the sensor arrangement 1 in a heat pump application 32. Reference numeral 29 thereby refers to a compressor, reference numeral 30 refers to an outer condenser and reference numeral 31 refers to an inner condenser in the heat pump application 32. Of course, the sensor arrangement 1 can be used in a wide range of other applications that have pipes where the sensor arrangement 1 can be clipped onto.

The invention claimed is:

1. A sensor arrangement comprising:
   a mounting element configured to mount the sensor arrangement directly to a surface;
   a basic body removably attached to the mounting element;
   at least one sensor element arranged in an interior of the basic body;
   a separating element at least partly arranged in the basic body,
   wherein the separating element is configured to hold the sensor element in a fixed position with respect to the basic body; and
   a locking mechanism configured to lock the basic body to the mounting element;
   wherein the locking mechanism comprises at least one first locking element and at least one second locking element, which are configured to mechanically cooperate with one another to lock the basic body to the mounting element, wherein the first locking element is arranged at the separating element, wherein the first locking element extends in a direction away from the surface once the sensor arrangement is mounted to the surface, and wherein the first locking element is part of the separating element.

2. The sensor arrangement according to claim 1, wherein the second locking element is arranged on the mounting element.

3. The sensor arrangement according to claim 1, wherein the first locking element comprises a protrusion, and wherein the second locking element comprises an indentation.

4. The sensor arrangement according to claim 1, wherein the mounting element comprises at least one fixation spring configured to hold the basic body in a fixed position with respect to the mounting element.

5. The sensor arrangement according to claim 1, wherein the separating element is configured to provide an insulation of the sensor arrangement.

6. The sensor arrangement according to claim 1, wherein the mounting element comprises a clip.

7. The sensor arrangement according to claim 1, wherein the sensor arrangement is configured to be mounted to the surface in a single step.

8. The sensor arrangement according to claim 1, wherein the sensor element comprises an NTC thermistor.

9. The sensor arrangement according to claim 1, wherein the sensor arrangement is configured to operate within a range of −40° C. to +200° C.

10. The sensor arrangement according to claim 1, wherein the sensor arrangement is configured to measure a surface temperature of a pipe.

11. A method for using the sensor arrangement according to claim 1, the method comprising:
measuring a surface temperature of a pipe, wherein the sensor arrangement is clipped to the surface, the surface being a surface of the pipe.

12. A method for assembling the sensor arrangement according to claim 1, the method comprising:
providing the sensor element, the basic body, the separating element, the mounting element, and at least two wires;
electrically connecting the sensor element by the wires and introducing the sensor element and the wires into the separating element;
introducing the separating element, the wires, and the sensor element into the basic body such that the sensor element is fixed against movement relative to the basic body;
non-releasably fixing the separating element to the basic body; and
removably locking the basic body to the mounting element.

13. The method according to claim 12, further comprising clipping the sensor arrangement to a surface of a pipe.

\* \* \* \* \*